(12) United States Patent
Michal et al.

(10) Patent No.: US 6,584,246 B1
(45) Date of Patent: Jun. 24, 2003

(54) SOURCE, SYSTEM AND METHOD FOR GENERATING AMPLIFIED STIMULATED EMISSION USING A COUPLER MECHANISM

(75) Inventors: Ronald James Michal, Wrightwood, CA (US); Gregory Scott Moore, Saugus, CA (US); David Michael Rozelle, Woodland Hills, CA (US); Fernando Torres, Valley Village, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 273 days.

(21) Appl. No.: 09/610,032

(22) Filed: Jul. 5, 2000

(51) Int. Cl.[7] ................................................. G02B 6/34
(52) U.S. Cl. .............................. 385/27; 372/6; 359/341
(58) Field of Search ............................... 372/6, 20, 22, 372/21, 102, 66, 92; 359/124, 161, 341.5, 341.4, 179; 385/37

(56) References Cited

U.S. PATENT DOCUMENTS

| | | | | |
|---|---|---|---|---|
| 5,237,576 A | * | 8/1993 | DiGiovanni et al. | 372/6 |
| 5,701,194 A | * | 12/1997 | Meli et al. | 359/124 |
| 5,907,420 A | * | 5/1999 | Chraplyvy et al. | 359/124 |
| 5,974,059 A | * | 10/1999 | Dawson | 372/102 |

* cited by examiner

Primary Examiner—Akm E. Ullah

(57) ABSTRACT

A source, system and method for generating amplified stimulated emission is provided. The source includes a pump source for generating a pump light which is provided to a doped element, such as a doped fiber. Based on the pump light, the doped fiber, which may be a erbium doped fiber, generates the amplified stimulated emission. A coupler mechanism provides the pump light to the doped fiber and transmits the amplified stimulated emission from the doped fiber. The coupler mechanism isolates the pump light and the amplified stimulated emission using phase conditions. A system is also provided including a source and a sensor, such as a fiber optic gyroscope. A method for generating the amplified stimulated emission is further provided.

30 Claims, 1 Drawing Sheet

SOURCE, SYSTEM AND METHOD FOR GENERATING AMPLIFIED STIMULATED EMISSION USING A COUPLER MECHANISM

BACKGROUND OF THE INVENTION

The present invention generally relates to amplified stimulated emission (ASE) sources and methods for generating ASE and, in particular, to a source and method, which may be used with a fiber optic gyroscope, for generating ASE using a coupler mechanism to isolate pump light entering a doped element, such as a doped fiber, from ASE leaving the doped fiber.

Many sensors and communications devices require a ASE source with a stable centroid (or average) wavelength over time and over a broad temperature and drive current range to operate properly. In a typical broadband source, a wavelength division multiplexer (WDM) is employed to separate pump light, or laser light, from ASE generated by a length of erbium doped fiber (EDF). In particular, the WDM receives pump light from a pump source and transmits the pump light to the EDF. In response to the pump light, the EDF emits ASE back into the WDM. The WDM routes the ASE to a sensor, or for example a gyroscope. Unfortunately, WDMs are relatively costly which increases the cost of the laser light source. The WDM is also a major contributor to instability of the desired stable centroid wavelength.

Accordingly, there is a need in the art for an ASE source and method which provides ASE having a relatively stable centroid wavelength, which eliminates the need for a WDM and which uses a coupling mechanism to separate pump light and ASE.

SUMMARY OF THE INVENTION

This need is met by a source, system and method in accordance with the present invention in which a coupler mechanism, which may be a fiber coupler, transmits pump light from a pump source to a doped fiber, transmits ASE from the doped fiber and isolates the pump light and the ASE from one another.

In accordance with one aspect of the present invention, a source is provided in which a pump source generates pump, or laser, light. A doped fiber, such as an erbium doped optic fiber, generates ASE based on the pump light. A coupler mechanism interposed between the pump source and the doped fiber receives the pump light from the pump source, transmits the pump light to the doped fiber, transmits the ASE from the doped fiber and isolates the pump light and the ASE using phase conditions.

Although the coupler mechanism is generally shown as a two by two fused fiber coupler, any coupler may be advantageously employed in the present invention. Specifically, the coupler mechanism may comprise a fiber coupler including a first port for receiving the pump light, a second port for transmitting the pump light to the doped fiber and for receiving the ASE from the doped fiber, a third port for receiving the amplified stimulated emission from the doped fiber and for transmitting the pump light to the doped fiber and a fourth port for transmitting the amplified stimulated emission. A feedback reflector, such as a reflective Bragg grating, may reflect a portion of the amplified stimulated emission back into the doped fiber to substantially lock a wavelength of the amplified stimulated emission generated by the doped fiber. In addition, by reflecting the portion of the ASE back into the fourth port of the fiber coupler, almost all of the generated ASE will exit the fourth port due to the principle of reciprocity.

In accordance with another aspect of the present invention, a system is provided comprising a source and a sensor. The source generates ASE which is used by the sensor for sensing a parameter. The source comprises a pump source for generating pump light, a doped fiber for generating ASE based on the pump light, and a coupler mechanism. The coupler mechanism receives the pump light from the pump source, transmits the pump light to the doped fiber, transmits the ASE from the doped fiber and isolates the pump light and the ASE using phase conditions. A sensor senses a parameter, such as movement, using the ASE. The sensor may be a fiber optic gyroscope.

In accordance with yet another aspect of the present invention, a method for generating ASE is provided. The method comprising the steps of: generating a pump light; transmitting the pump light through a coupler mechanism to an doped fiber; generating ASE by the doped fiber based on the pump light; and transmitting the ASE through the coupler mechanism. The method may further comprise the step of reflecting a portion of the ASE back into doped fiber through the coupler mechanism with a Bragg grating.

These and other features and advantages of the present invention will become apparent from the following detailed description, the accompanying drawings and the appended claims.

BRIEF DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
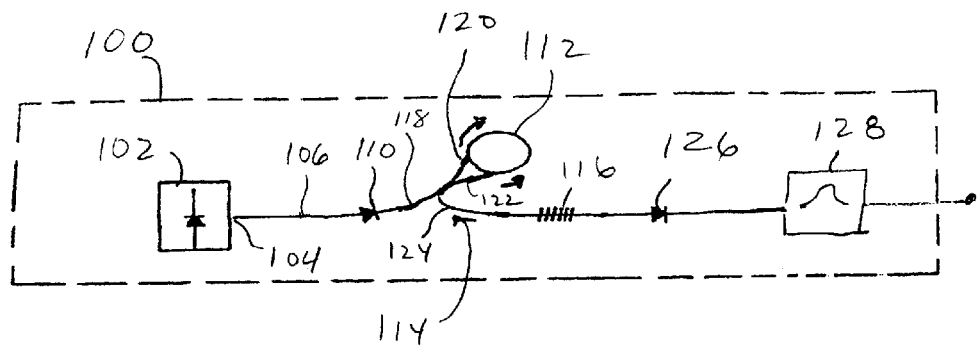
FIG. 1 is schematic diagram of a source employing a coupler mechanism for generating ASE in accordance with the present invention.

A source 100 for generating amplified simulated emission (ASE) in accordance with the present invention is shown in FIG. 1. In the source 100, a pump source, such as a laser diode 102, generates a highly polarized pump, or laser, light of typically greater than 10 dB polarization. The laser diode 102 may be a commonly available Fabry-Perot type semiconductor laser diode with an optical fiber pigtail 104.

The optical pigtail 104 is coupled to an optic fiber segment 106, which may be coupled to a first, or pump isolator 110. While commonly available laser diodes are typically supplied with non-polarization maintaining (low birefringence) pigtails, a polarization maintaining (PM) optical fiber pigtail 104 and optic fiber segment 106 may used in the present invention. Such a use of PM fiber will reduce the loss of polarization of the pump light and increase the wavelength stability of the laser light source 100.

The pump isolator 110 prohibits ASE generated by a doped element, such as a doped fiber 112 or, in particular, an erbium doped fiber, from entering the laser diode 102. As is known in the art, for an erbium doped fiber, the pump light should be typically around 1480 nm and the centroid wavelength of the ASE would typically be around 1560 nm. Any appropriate wavelengths may be used, however, based on the materials and elements being employed. The present invention is not limited by the wavelengths being employed in the pump light or the ASE.

A coupler mechanism, such as a 2×2 fused fiber coupler 114, receives the pump light from the laser diode 102 and transmits the pump light to the doped fiber 112. It should be understood that other types of couplers may also be advantageously employed in accordance with the present invention. The fiber coupler 114 splits the pump light and directs the pump light into each end of the doped fiber 112. In response to the pump light, the doped fiber 112 generates ASE. The ASE travels out of the doped fiber 112 to a grating 116. The coupler 114 employs phase conditions to isolate the pump light and the ASE from each other.

Specifically, the pump light enters the coupler 114 at a first port 118, splits and travels out second and third ports 120 and 122 to the doped fiber 112. The third port 122 of the coupler 114 receives the ASE from the doped fiber 112. The ASE exits the coupler 114 via a fourth port 124. The coupler 114 is designed so that the coupling action isolates the pump light from the ASE. In other words, only the pump light at about 1460 nm is permitted to travel from the first port 118 into the doped fiber 112. And similarly, only the ASE at about 1560 nm is permitted to travel from the third port 122 out the fourth port 124.

The pump light at a wavelength of 1480 nm is a long coherence light. Further, the doped fiber 112 forms a loop which acts like an interferometer with respect to the pump light. Consequently, any residual, or unused, pump light not used to stimulate the doped fiber 112 is directed back into the coupler 114 into the same port (either the second or third port 120 or 122) it entered due to phase conditions, referred to as reciprocity. Counterpropagating pump light beams in the doped fiber 112 will therefore interfere constructively only if the two beams exit out the coupler 114 at the port they entered, or the first port 118. No pump light exits the fourth port 124 since the beams have a 180 degree mismatch between them at the fourth port 124 which corresponds to complete destructive interference. Accordingly, the coupler 114 and the doped fiber 112 form a closed loop that interferometrically guides the pump light to exit the first port 118, or the port at which it entered, of the coupler 114. Hence, the physical properties, or phase conditions of the optical coupler 114 and the doped fiber 112 require that the long coherence pump light exit the coupler 114 at the same port at which it entered.

The ASE, which is broadband light, is generated by spontaneous emission. The clockwise (CW) and counter clockwise (CCW) waves, being independently, spontaneously generated, are not coherent and have no fixed phase relationship. Hence, unlike the pump light, for which the CW and CCW beams are coherent, the ASE CW and CCW beams do not interfere when recombined at the coupler 114, resulting in half of each ASE beam going out each-port 118 and 124.

If a portion of the ASE travels out the first port 118 (backward ASE), a number of methods may be employed to handle the backward ASE. For example, the pump isolator 110 may block and dissipate the ASE to prevent lasing and optimizes the ASE exiting the fourth port 124.

ASE exiting the fourth port 124 is provided to a feedback reflector, such as the Bragg grating 116. Although only a single Bragg grating 116 is shown, it should be understood that more than one Bragg grating may be implemented in series in the present invention. The Bragg grating 116, which is preferably a reflective Bragg grating, reflects a portion of the ASE back into the doped fiber 112 via the coupler 114.

The reflective Bragg grating 116 may, for example, reflect back about 1% of the ASE. This reflection acts as a pilot signal with a defined amplitude, frequency, and phase. This pilot signal is split into CW and CCW beams at the coupler 114. The pilot signal is amplified, via stimulated emission, maintaining frequency and phase, and diminishes the spontaneous emission. When the stimulated emission CW and CCW beams recombine at the coupler 114, unlike the spontaneous emission, they will interfere. In the absence of a nonreciprocal phase shift, all the light will exit the port at which the pilot signal was injected. By tailoring the reflection versus wavelength characteristics of the reflector used to generate the pilot signal the output spectrum will be locked to reflector.

Alternately, in place of the reflector 116, the pilot signal may be a communication transmission. Via the same mechanism as described above, the signal intensity would be amplified and retransmitted on the same port from which the signal was received.

A second, or output isolator 126 prevents light from being transmitted into the doped fiber 112 from outside the source 100. A bandpass filter 128 may also be provided to remove pump light from the ASE, since under some conditions a small fraction of the pump light may leak thought the coupler 114. Can use bandpass filter 128 to tune ASE wavelength. Alternatively, or in addition, a blocking grating may be provided to block any pump light which leaks through the coupler 114.

Figure 2:
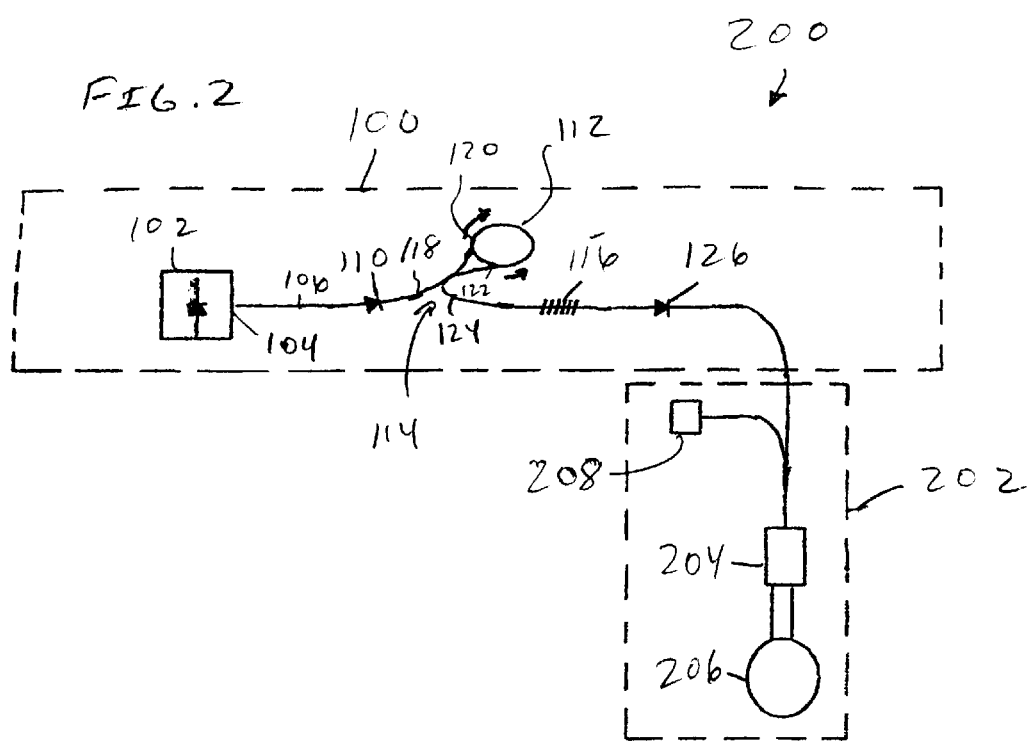
FIG. 2 is a schematic diagram of a system comprised of a source and sensor in accordance with another aspect of the present invention.

In accordance with another aspect of the present invention, a system 200 comprised of the source 100 and a sensor, such as a fiber optic gyroscope 202, is shown in FIG. 2. For clarity and ease of description, like elements from FIG. 1 are designated by the same reference numerals in FIG. 2. The fiber optic gyroscope 202 may be of the type shown in U.S. Pat. No. 5,260,768 to Cordova et al. entitled Fiber Optic Gyro with Low Birefringence and PM Fiber Networks. The gyroscope 202 is shown comprised of an integrated optic chip 204 coupled to a sensor coil 206. The ASE from the source 100 is provided to the integrated optic chip 204. The ASE from the integrated optic chip 204 is directed to the sensor coil 206 in counter propagating directions, as is well known in the art, and is directed back through the integrated optic chip 204 to a photo detector 208. Rotation of the sensor coil 206 is detected using electronics (not shown) in accordance with the Sagnac effect. The gyroscope 202 senses movement by monitoring the rotating of the sensor coil 206. Although the gyroscope 202 is illustrated, any sensor for sensing a desired parameter using the ASE may be advantageously employed in the present invention.

By providing a relatively stable supply of ASE to the gyroscope 202, a substantial source of error, in particular scale factor error, in the rotation measurements of the gyroscope may be reduced, or eliminated. Although shown in the context of use with a fiber optic gyroscope, the source 100 of the present invention may be used in any situation in which a source of ASE that produces a relatively consistent centroid wavelength over time and which provides a minimal amount of pump light in the ASE is desired.

The present invention may be advantageously employed in the amplification of an input signal, such as a telecommunications signal. For example, the source 100 may be connected via a T connection into a fiber between a transmitter of the input signal and an intended receiver of the input signal. The isolator 126, in this implementation, is removed to permit the input signal from the transmitter to enter the fourth port 124 of the coupler 114. The input signal, which is at approximately the wavelength of the ASE, is amplified by the doped fiber 112 and retransmitted out of the fourth port 124 due to reciprocity, as described above. The amplified input signal is then injected back into the fiber and is transmitted to the intended receiver.

While the invention may be susceptible to various modifications and alternative forms, specific embodiments have been shown by way of example in the drawings and have been described in detail herein. For example, a reflective Bragg grating may be positioned between the first port 118 and the laser diode 102 to reflect pump light reflected back through the first port 118 back into the doped fiber 112. Additionally, a reflective Bragg grating may be positioned to receive the pump light from the laser diode 102 and reflect a portion of the pump light back to the laser diode 102 to lock the wavelength of the pump light. Therefore, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A source for providing amplified stimulated emission comprising:

a pump source for generating pump light;

a doped fiber for generating the amplified stimulated emission based on the pump light; and a coupler mechanism for receiving the pump light from the pump source, for transmitting the pump light to the doped fiber, for transmitting the amplified stimulated emission from the doped fiber and for isolating the pump light and the amplified stimulated emission using phase conditions.

2. The source as recited in claim 1 wherein the doped optic fiber comprises an erbium doped optic fiber.

3. The source as recited in claim 1 wherein the coupler mechanism comprises a two by two fiber coupler.

4. The source as recited in claim 2 wherein the coupler mechanism comprises a two by two fused fiber coupler.

5. The source as recited in claim 4 wherein the fiber coupler comprises:

a first port for receiving the pump light;

a second port for transmitting the pump light to the doped fiber and for receiving the amplified stimulated emission from the doped fiber;

a third port for receiving the amplified stimulated emission from the doped fiber and for transmitting the pump light to the doped fiber; and a fourth port for transmitting the amplified stimulated emission.

6. The source as recited in claim 4 comprising a Bragg grating for receiving the amplified stimulated emission from the coupler mechanism and for prohibiting transmission of any pump light which may have passed through the coupler mechanism.

7. The source as recited in claim 1 comprising a reflective Bragg grating for reflecting a portion of the amplified stimulated emission back into the doped fiber.

8. The source as recited in claim 1 comprising a feedback reflector for reflecting a portion of the amplified stimulated emission back into the doped fiber to substantially lock a wavelength of the amplified stimulated emission generated by the doped fiber.

9. The source as recited in claim 1 comprising a bandpass filter for receiving the amplified stimulated emission from the coupler mechanism and for filtering any pump light which may have passed through the coupler mechanism.

10. A system comprising:

a pump source for generating pump light;

a doped fiber for generating amplified stimulated emission based on the pump light;

a coupler mechanism for receiving the pump light from the pump source, for transmitting the pump light to the doped fiber, for transmitting the amplified stimulated emission from the doped fiber and for isolating the pump light and the amplified stimulated emission using phase conditions; and a sensor for sensing a parameter using the amplified stimulated emission.

11. The system as recited in claim 10 wherein the sensor is a fiber optic gyroscope.

12. The system as recited in claim 11 wherein the coupling mechanism comprises a fiber coupler.

13. The system as recited in claim 12 wherein the fiber coupler comprises:

a first port for receiving the pump light;

a second port for transmitting the pump light to the doped fiber and for receiving the amplified stimulated emission from the doped fiber;

a third port for receiving the amplified stimulated emission from the doped fiber and for transmitting the pump light to the doped fiber; and a fourth port for transmitting the amplified stimulated emission.

14. The system as recited in claim 13 comprising a Bragg grating for receiving the amplified stimulated emission from the coupler mechanism and for prohibiting transmission of any pump light which may have passed through the coupler mechanism.

15. The system as recited in claim 14 wherein the Bragg grating comprises a reflective Bragg grating for reflecting a portion of the amplified stimulated emission back into the doped fiber.

16. The system as recited in claim 14 comprising a bandpass filter for receiving the amplified stimulated emission from the coupler mechanism and for filtering any light outside a desired wavelength of the amplified stimulated emission.

17. The system as recited in claim 10 comprises a feedback reflector for reflecting a portion of the amplified stimulated emission back into the doped fiber to substantially lock a wavelength of the amplified stimulated emission generated by the doped fiber.

18. A method for generating amplified stimulated emission comprising the steps of: generating a pump light;

transmitting the pump light through a coupler mechanism to a doped element;

generating amplified stimulated emission by the doped fiber based on the pump light;

transmitting the amplified stimulated emission through the coupler mechanism; and isolating the pump light and the amplified stimulated emission using phase conditions.

19. The method as recited in claim 18 comprising the step of:

reflecting a portion of the amplified stimulated emission back into the doped element through the coupler mechanism with a Bragg grating.

20. The method as recited in claim 19 wherein the doped element is a doped fiber.

21. A source for amplifying an input signal comprising:

a pump source for generating pump light;

a doped fiber for generating amplified stimulated emission based on the pump light, the amplified stimulated emission being capable of amplifying the input signal; and a coupler mechanism for receiving the pump light from the pump source, for transmitting the pump light to the doped fiber, for receiving the input signal, for transmitting the input signal into the doped fiber, and for transmitting the amplified input signal away from the doped fiber.

22. The source as recited in claim 21 wherein the input signal is a communication signal.

23. The source as recited in claim 22 wherein the doped optic fiber comprises an erbium doped optic fiber.

24. The source as recited in claim 23 wherein the coupler mechanism comprises a two by two fiber coupler.

25. The source as recited in claim 24 wherein the fiber coupler comprises:

a first port for receiving the pump light;

a second port for transmitting the pump light to the doped fiber and for receiving the amplified input signal from the doped fiber;

a third port for receiving the amplified input signal from the doped fiber and for transmitting the pump light to the doped fiber; and a fourth port for receiving the input signal and for transmitting the amplified input signal.

26. The source as recited in claim 1 wherein the coupler mechanism comprises a port for transmitting the pump light to the doped fiber and for receiving the amplified stimulated emission from the doped fiber.

27. The system as recited in claim 10 wherein the coupler mechanism comprises a port for transmitting the pump light to the doped fiber and for receiving the amplified stimulated emission from the doped fiber.

28. The method as recited in claim 18 wherein the coupler mechanism comprises a port for transmitting the pump light to the doped fiber and for receiving the amplified stimulated emission from the doped fiber.

29. The source as recited in claim 21 wherein the coupler mechanism comprises a port for transmitting the pump light to the doped fiber and for receiving the amplified input signal from the doped fiber.

30. The source as recited in claim 21 wherein the coupler mechanism comprises a port for receiving the input signal and for transmitting the amplified input signal.

* * * * *